(12) United States Patent
Li et al.

(10) Patent No.: US 9,488,262 B2
(45) Date of Patent: Nov. 8, 2016

(54) AUTOMATIC TRANSMISSION WITH CONFIGURABLE DYNAMIC TURBINE DAMPER

(71) Applicant: GM GLOBAL TECHNOLOGY OPERATIONS LLC, Detroit, MI (US)

(72) Inventors: Dongxu Li, Troy, MI (US); Victor M. Roses, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 14/560,510

(22) Filed: Dec. 4, 2014

(65) Prior Publication Data

US 2016/0160970 A1 Jun. 9, 2016

(51) Int. Cl.
*F16H 45/02* (2006.01)
*F16H 45/00* (2006.01)

(52) U.S. Cl.
CPC ......... *F16H 45/02* (2013.01); *F16H 2045/005* (2013.01); *F16H 2045/007* (2013.01); *F16H 2045/0221* (2013.01); *F16H 2045/0226* (2013.01); *F16H 2045/0247* (2013.01)

(58) Field of Classification Search
CPC .................... F16H 2045/005; F16H 2045/007; F16H 2045/0221; F16H 2045/0226; F16H 2045/0247
See application file for complete search history.

(56) References Cited

U.S. PATENT DOCUMENTS

| | | | | |
|---|---|---|---|---|
| 4,018,106 | A * | 4/1977 | Uozumi | F16H 3/663 475/47 |
| 4,125,037 | A * | 11/1978 | Palmer | F16H 37/021 474/28 |
| 6,070,704 | A * | 6/2000 | Sasse | F16H 45/02 192/3.28 |
| 6,079,529 | A * | 6/2000 | Hinkel | F16H 45/02 192/3.26 |
| 7,143,879 | B2 * | 12/2006 | Ackermann | F16H 45/02 192/213.1 |
| 7,926,635 | B2 * | 4/2011 | Kombowski | F16D 25/0638 192/3.26 |
| 2009/0283376 | A1 * | 11/2009 | Degler | F16F 15/12353 192/3.28 |

* cited by examiner

*Primary Examiner* — Ramya Burgess
*Assistant Examiner* — David Morris
(74) *Attorney, Agent, or Firm* — Quinn Law Group, PLLC

(57) ABSTRACT

A transmission includes a torque converter including a pump and a turbine, and an input hub. A pump lock-up clutch selectively connects the pump and the input hub for directly communicating torque therebetween when the lock-up clutch is engaged. A first pump damper interconnects the pump lock-up clutch and the input hub for damping torsional vibration between the pump and the input hub when the pump-lock up clutch is engaged. A turbine damper interconnects the turbine and either the pump or the input hub. The turbine damper is operable to dampen torsional vibration between the turbine and ether the pump or the input hub when the pump lock-up clutch is engaged. A turbine lock-up clutch selectively connects the turbine and either the input hub or the pump for directly communicating torque between the turbine and the one of either the input hub or the pump.

13 Claims, 4 Drawing Sheets

AUTOMATIC TRANSMISSION WITH CONFIGURABLE DYNAMIC TURBINE DAMPER

TECHNICAL FIELD

The disclosure generally relates to an automatic transmission for a vehicle.

BACKGROUND

Automatic transmissions include a torque converter, which includes a pump and a turbine that cooperate to provide a fluid coupling for communicating torque between an engine and a drivetrain. During normal operation, when the fluid coupling of the torque converter is transmitting torque from the engine to the drivetrain, the fluid coupling of the torque converter dampens torsional vibration, i.e., torque fluctuation, between the engine and the drivetrain.

Some automatic transmissions are equipped with a lock-up clutch, which mechanically connects the pump and the turbine to mechanically transmit torque from the engine to the drivetrain. When the lock-up clutch is engaged, and the pump and the turbine are mechanically connected, the fluid coupling provided by the torque converter is unable to dampen torsional vibration. In order to dampen torsional vibration between the engine and the drivetrain when the lock-up clutch is engaged, the transmission may be equipped with a torsional vibration damper. The torsional vibration damper interconnects two different components of the transmission to dampen vibration therebetween. For example, the torsional vibration damper may interconnect the turbine and an input hub of the transmission to dampen torsional vibration from the engine when the lock-up clutch is engaged and mechanically connecting the pump and the turbine.

SUMMARY

A transmission is provided. The transmission includes a torque converter including a pump and a turbine, and an input hub. A pump lock-up clutch selectively connects the pump and the input hub for directly communicating torque therebetween when the lock-up clutch is engaged. A first pump damper interconnects the pump lock-up clutch and the input hub for damping torsional vibration between the pump and the input hub when the pump-lock up clutch is engaged. A turbine damper interconnects the turbine and the input hub. The turbine damper is operable to dampen torsional vibration at the input hub when the pump lock-up clutch is engaged. A turbine lock-up clutch selectively connects the turbine and the input hub to bypass the turbine damper.

Accordingly, because the turbine of the torque converter is connected to the input hub by either the turbine damper or the turbine lock-up clutch, the transmission may be operated in two different damping modes to maximize the damping capability of the first pump damper with a wider frequency range. Specifically, the transmission may be operated in either a first mode or a second mode when the pump lock-up clutch is engaged. When the transmission is operating in the first mode, the pump lock-up clutch is disposed in an engaged position and the turbine lock-up clutch is disposed in a disengaged position. The first mode of operation allows the turbine and the turbine damper to cooperate with the pump damper to dampen torsional vibration at the input hub at a selected frequency. When the transmission is operating in the second mode, the pump lock-up clutch is disposed in the engaged position, and the turbine lock-up clutch is disposed in an engaged position. The second mode of operation prevents the turbine damper from moving relative to the input hub, and allows only the pump damper to dampen torsional vibration between the pump and the input hub at other frequencies.

The above features and advantages and other features and advantages of the present teachings are readily apparent from the following detailed description of the best modes for carrying out the teachings when taken in connection with the accompanying drawings.

DETAILED DESCRIPTION

Figure 1:
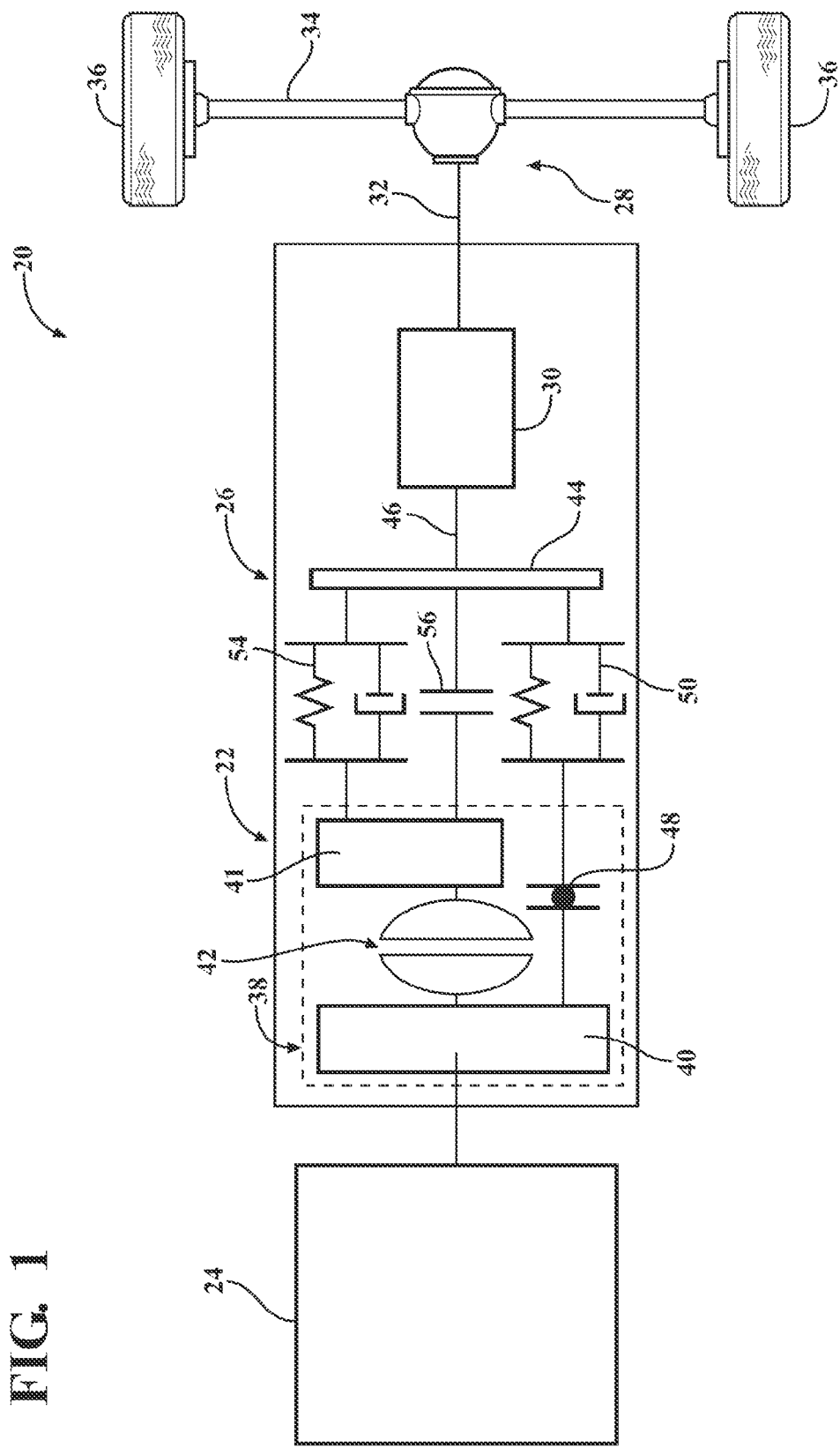
FIG. 1 is a schematic plan view of a vehicle showing a transmission in a first operating mode.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, an exemplary embodiment of a vehicle is generally shown at 20. As shown in the Figures, the vehicle 20 includes a powertrain 22 having an engine 24, a transmission 26, and a drive train 28. The engine 24 may include any type and/or style of power plant capable of producing torque, such as but not limited to a gasoline engine or a diesel engine. The engine 24 produces torque, which is directed to the transmission 26. The transmission 26 passes the torque through a gear train 30, which changes the rotational speed and torque from the engine 24, and directs the torque to the drive train 28. The drive train 28 may include, for example, a drive shaft 32 and axle 34 that is directly or indirectly attached to one or more drive wheels 36. It should be appreciated that the specific configuration of the vehicle 20 may differ from the exemplary embodiment shown in the Figures.

The transmission 26 may be referred to as an automatic transmission 26, which automatically changes between different gear ratios. The transmission 26 includes a torque converter 38. The torque converter 38 operates in a manner known to those skilled in the art. As such, the operation of the torque converter 38 is not described in detail herein. The torque converter 38 includes a pump 40 and a turbine 41 that cooperate together to generate a fluid coupling 42 therebetween for communicating torque. As is known in the art, the pump 40 of the torque converter 38 rotates with the engine 24, and the fluid coupling 42 between the turbine 41 and the pump 40 operates to rotate the turbine 41. The turbine 41 is connected to an input of the transmission 26, such as an input hub 44 and/or an input shaft 46, to transfer torque to the gear train 30 of the transmission 26. It should be appreciated that the input hub 44 may be integrally formed with and/or fixedly attached to the input shaft 46. Alternatively, the input hub 44 and the input shaft 46 may be separate components, either directly or indirectly connected to each other, to communicate torque therebetween.

The transmission 26 includes a pump lock-up clutch 48. The pump lock-up clutch 48 selectively connects the pump 40 and the input hub 44 of the transmission 26 in mechanical engagement for directly communicating torque between the pump 40 and the input hub 44. While the written description describes, and the Figures show, the pump lock-up clutch 48 selectively connected to the input hub 44 of the transmission 26, it should be appreciated that the input hub 44 to which the pump lock-up clutch 48 is selectively connected may include or alternatively be referred to as the input shaft 46, or some other component of the transmission 26, excluding the turbine 41 of the torque converter 38. Accordingly, the pump lock-up clutch 48 does not directly connect the pump 40 and the turbine 41, as is common for a conventional torque converter 38 lock-up clutch. The pump lock-up clutch 48 may include, but is not limited to, a wet or dry friction plate clutch, or some other type of clutch capable of transmitting torque between the pump 40 of the torque converter 38 and the input hub 44 of the transmission 26.

The pump lock-up clutch 48 is moveable between an engaged position and a disengaged position. When disposed in the engaged position, the pump lock-up clutch 48 is operable to mechanically connect the pump 40 and the input hub 44 in torque communication, such that torque is directly transferred from the pump 40 to the input hub 44 of the transmission 26 without any energy or efficiency losses through the fluid coupling 42 of the torque converter 38. When disposed in the disengaged position, the pump lock-up clutch 48 mechanically disconnects the pump 40 and the input hub 44, such that the only torque transmitted from the pump 40 to the turbine 41 is through the fluid coupling 42 of the torque converter 38.

The transmission 26 includes a first pump damper 50, which interconnects the pump lock-up clutch 48 and the input hub 44. Accordingly, the pump 40 is connected to the input hub 44 through the pump lock-up clutch 48 and the first pump damper 50. When the pump lock-up clutch 48 is disposed in the engaged position such that torque is being directly transferred from the pump 40 to the input hub 44, through the pump lock-up clutch 48, the first pump damper 50 dampens rotational vibration between the pump 40 and the input hub 44 of the transmission 26, e.g., fluctuations in torque from the engine 24. The first pump damper 50 may include any rotational damper assembly suitable for use in the transmission 26, and capable of damping a difference in rotational speed and/or torque between two connected rotating components.

Figure 3:
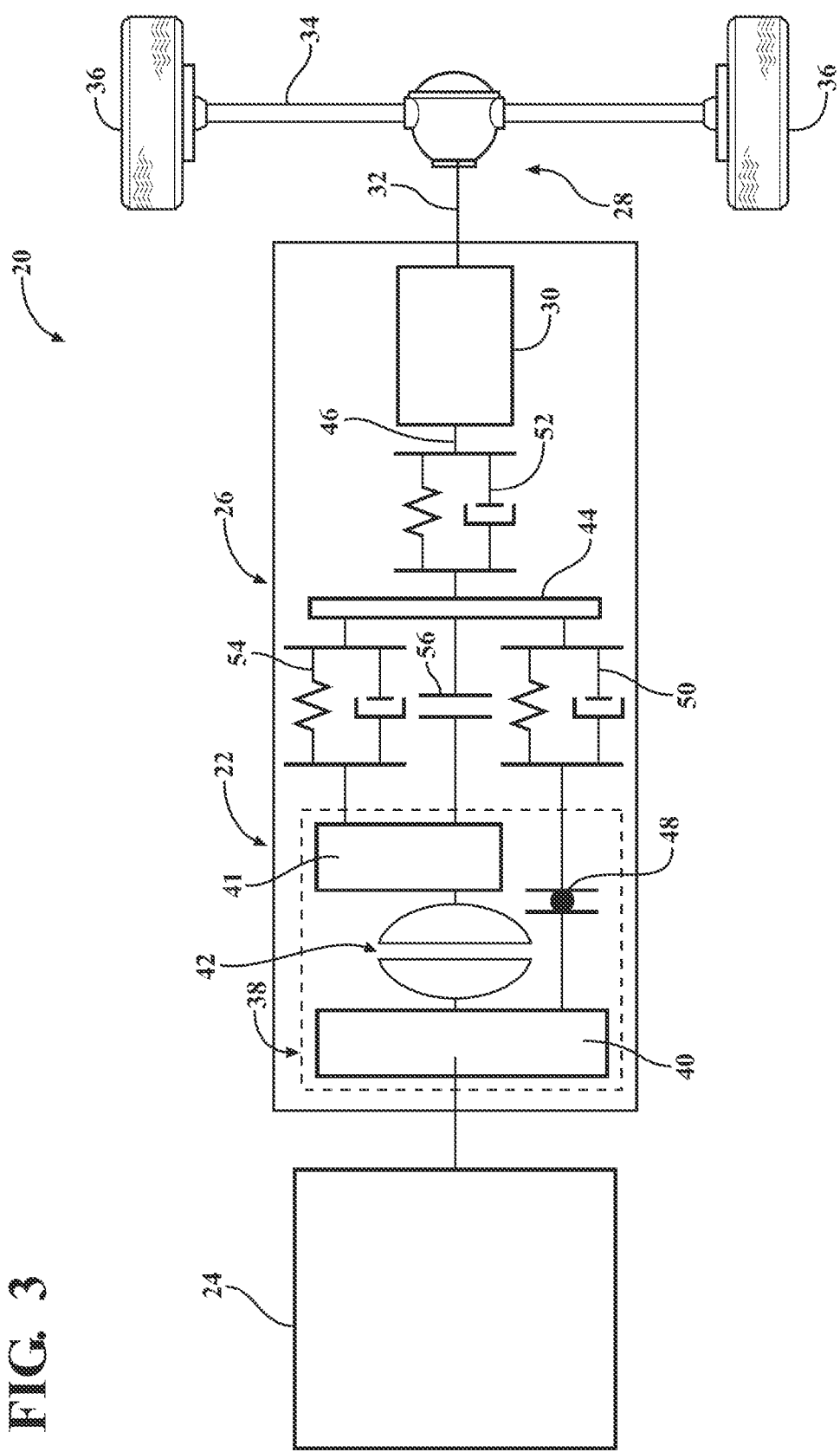
FIG. 3 is a schematic plan view of the vehicle showing a first alternative embodiment of the transmission.
Figure 4:
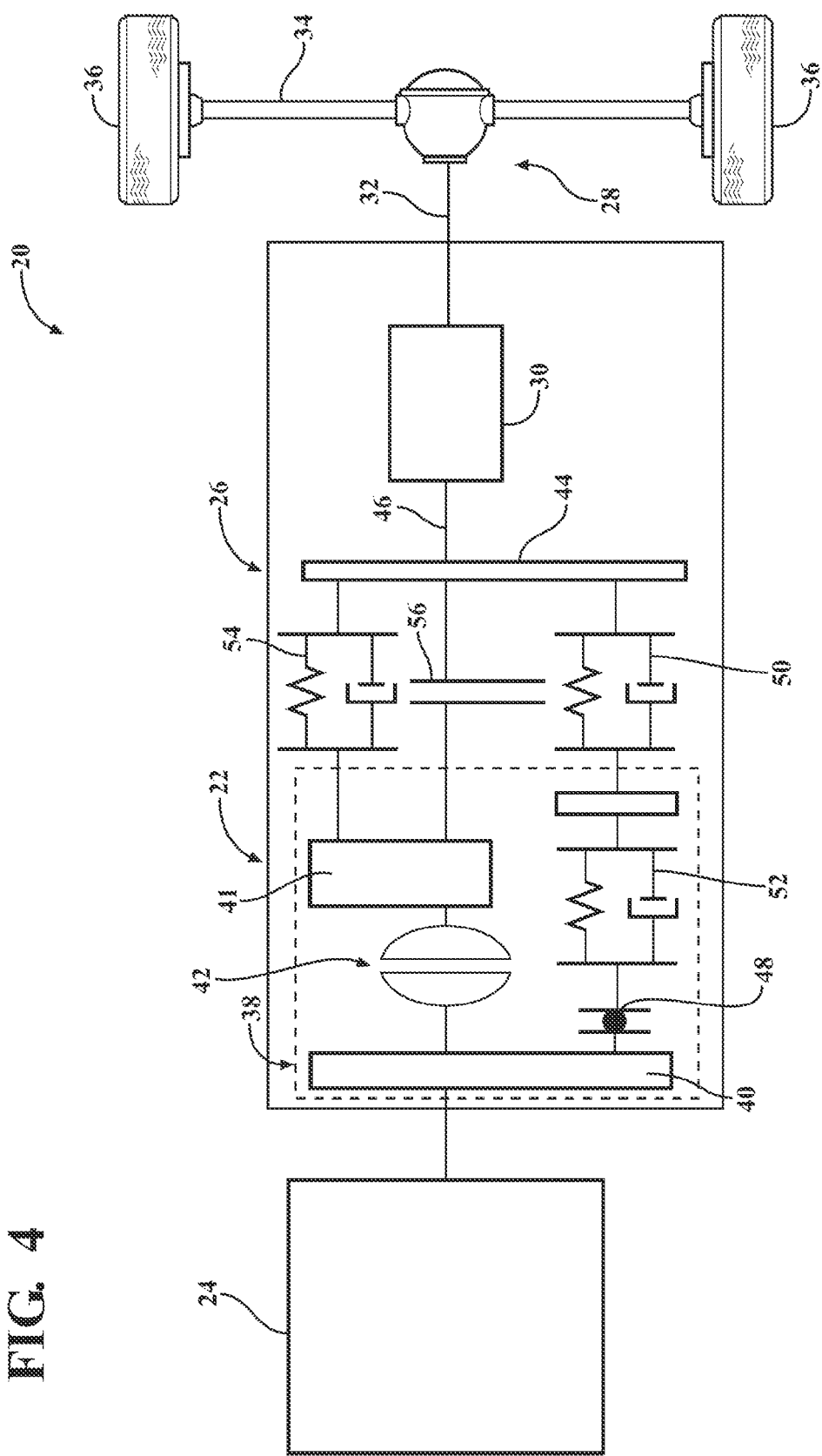
FIG. 4 is a schematic plan view of the vehicle showing a second alternative embodiment of the transmission.

As shown in FIG. 3, the transmission 26 may optionally include a second pump damper 52 coupled to, either directly or indirectly, one of the input hub 44 and the input shaft 46. FIG. 4 shows an alternative placement of the second pump damper 52, in which the second pump damper 52 is disposed between and interconnects the pump lock-up clutch 48 and the first pump damper 50. Accordingly, the embodiment of the transmission 26 shown in FIG. 4 shows the second pump damper 52 and the first pump damper 50 disposed in series with each other. The second pump damper 52 may include any rotational damper assembly suitable for use in the transmission 26, and capable of damping a difference in rotational speed and/or torque between two connected rotating components. The first pump damper 50 and the second pump damper 52 are disposed in series to provide additional damping capabilities.

Figure 2:
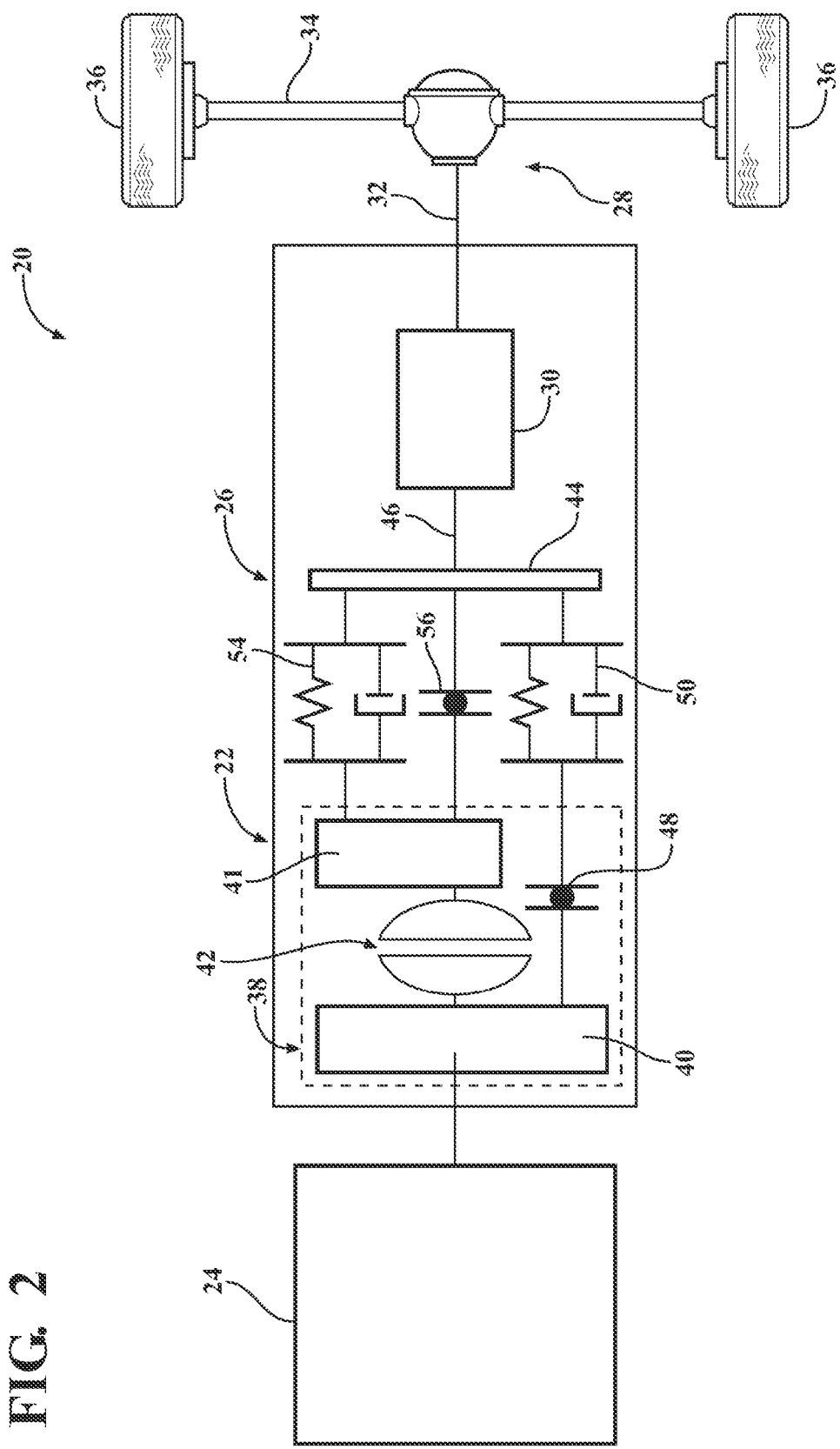
FIG. 2 is a schematic plan view of the vehicle showing the transmission in a second operating mode.

A turbine damper 54 interconnects the turbine 41 and the input hub 44. As shown in the Figures, the turbine damper 54 interconnects the turbine 41 and the input hub 44. The turbine damper 54 dampens rotational vibration between the turbine 41 and the input hub 44 of the transmission 26. As shown in FIGS. 1 and 2, the turbine damper 54 dampens rotational vibration in torque from the engine 24 at the input hub 44 that is not dampened by the first pump damper 50. The turbine damper 54 may include any rotational damper assembly suitable for use in the transmission 26, and capable of damping torsional and/or rotational vibration at the input hub 44.

A turbine lock-up clutch 56 selectively connects the turbine 41 and the input hub 44 in mechanical engagement for locking the turbine 41 and the input hub 44. As shown in FIGS. 1 and 2, the turbine lock-up clutch 56 selectively connects the turbine 41 and the input hub 44. Accordingly, both the turbine damper 54 and the turbine lock-up clutch 56 are both connected to the input hub 44.

The turbine lock-up clutch 56 is moveable between an engaged position and a disengaged position. When disposed in the engaged position, such as shown in FIG. 2, the turbine lock-up clutch 56 is operable to mechanically connect the turbine 41 and the input hub 44 in torque communication, i.e., in mechanically interlocked engagement. When disposed in the disengaged position, such as shown in FIG. 1, the turbine lock-up clutch 56 mechanically disconnects the turbine 41 from the input hub 44, such that the turbine 41 is only connected to the input hub 44 through the turbine damper 54.

The automatic transmission 26 is operable in a first mode and a second mode. Referring to FIG. 1, when operating in the first mode, the pump lock-up clutch 48 is disposed in the engaged position, and the turbine lock-up clutch 56 is disposed in the disengaged position. Because the turbine lock-up clutch 56 is disengaged, the turbine damper 54 is free to dampen torsional vibration at the input hub 44. With the pump lock-up clutch 48 engaged to transfer torque from the pump 40 to the input hub 44, the mass of the turbine 41 is free to vibrate slightly relative to the input hub 44 through the turbine damper 54 connecting the turbine 41 and the input hub 44. This configuration allows the mass of the turbine 41 to be used to help dampen torsional vibration. The turbine damper 54 may be tuned to dampen vibration at a desired frequency, such as may occur at certain engine 24 speeds. Accordingly, the first mode of operation allows the turbine 41 and the turbine damper 54 to cooperate with the pump 40 to dampen torsional vibration between the pump 40 and the input hub 44 at a first frequency.

Referring to FIG. 2, when operating in the second mode, the pump lock-up clutch 48 is disposed in the engaged position, and the turbine lock-up clutch 56 is disposed in the engaged position. Because the turbine lock-up clutch 56 is engaged, the turbine damper 54 is not free to dampen torsional vibration between the turbine 41 and the input hub 44, because the turbine 41 is not free to rotate relative to the input hub 44. The second mode of operation prevents the turbine damper 54 from damping torsional vibration at the input hub 44, and allows only the first pump damper 50 to dampen torsional vibration between the pump 40 and the input hub 44 at a second frequency.

By either engaging or disengaging the turbine lock-up clutch 56, when the pump lock-up clutch 48 is engaged, the transmission 26 changes the damping characteristics to meet the current operating speed of the engine 24. Accordingly, the transmission 26 may be operated in either the first mode or the second mode, depending upon the frequency of the torsional vibration, to best dampen the torsional vibration.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A transmission comprising:
a torque converter including a pump and a turbine;
an input hub;
a pump lock-up clutch selectively connecting the pump and the input hub for directly communicating torque therebetween, wherein the pump lock-up clutch is moveable between an engaged position and a disengaged position;
a first pump damper interconnecting the pump lock-up clutch and the input hub;
a turbine damper interconnecting the turbine and the input hub; and
a turbine lock-up clutch selectively connecting the turbine and the input hub, and moveable between an engaged position and a disengaged position;
wherein the transmission is operable in a first mode with the pump lock-up clutch disposed in the engaged position and the turbine lock-up clutch disposed in the disengaged position, and in a second mode with the pump lock-up clutch disposed in the engaged position and the turbine lock-up clutch disposed in the engaged position, wherein the first mode of operation allows the turbine and the turbine damper to cooperate with the pump damper to dampen torsional vibration at the input hub at a first frequency, and wherein the second mode of operation prevents the turbine damper from damping torsional vibration between the turbine and the input hub, and allows only the first pump damper to dampen torsional vibration at the input hub at second frequency.

2. The transmission set forth in claim 1 wherein the pump lock-up clutch is operable to mechanically connect the pump and the input hub in torque communication when disposed in the engaged position, and wherein the pump lock-up clutch mechanically disconnects the pump and the input hub when disposed in the disengaged position.

3. The transmission set forth in claim 2 wherein the turbine lock-up clutch is operable to mechanically connect the turbine the input hub in torque communication when disposed in the engaged position, and wherein the turbine lock-up clutch mechanically disconnects the turbine from the input hub when disposed in the disengaged position.

4. The transmission set forth in claim 1 wherein the pump-lock-up clutch does not directly connect the pump and the turbine.

5. The transmission set forth in claim 1 further comprising an input shaft connected to the input hub.

6. The transmission set forth in claim 5 further comprising a gear train coupled to the input shaft.

7. The transmission set forth in claim 6 further comprising a second pump damper disposed in series with the first pump damper.

8. An automatic transmission for a vehicle, the automatic transmission comprising:
a torque converter including a pump and a turbine, and operable to provide a fluid coupling for communicating torque therebetween;
an input hub;
a pump lock-up clutch selectively connecting the pump and the input hub for directly communicating torque therebetween;
wherein the pump lock-up clutch is moveable between an engaged position and a disengaged position, wherein the pump lock-up clutch is operable to mechanically connect the pump and the input hub in torque communication when disposed in the engaged position, and wherein the pump lock-up clutch mechanically disconnects the pump and the input hub when disposed in the disengaged position
a first pump damper interconnecting the pump lock-up clutch and the input hub;
a turbine damper interconnecting the turbine and the input hub; and
a turbine lock-up clutch selectively connecting the turbine and the input hub;
wherein the turbine lock-up clutch is moveable between an engaged position and a disengaged position, wherein the turbine lock-up clutch is operable to mechanically connect the turbine and the input hub in torque communication when disposed in the engaged position, and wherein the turbine lock-up clutch mechanically disconnects the turbine from the input hub when disposed in the disengaged position; and
wherein the automatic transmission is operable in a first mode with the pump lock-up clutch disposed in the engaged position and the turbine lock-up clutch disposed in the disengaged position, and in a second mode with the pump lock-up clutch disposed in the engaged position and the turbine lock-up clutch disposed in the engaged position, wherein the first mode of operation allows the turbine and the turbine damper to cooperate with the pump damper to dampen torsional vibration at the input hub at a first frequency, and wherein the second mode of operation prevents the turbine damper from damping torsional vibration between the turbine and the input hub, and allows only the first pump damper to dampen torsional vibration at the input hub at a second frequency.

9. The automatic transmission set forth in claim 8 wherein the pump-lock-up clutch does not directly connect the pump and the turbine.

10. The automatic transmission set forth in claim 8 wherein the pump is connected to the input hub through the pump lock-up clutch and the pump damper.

11. The automatic transmission set forth in claim 8 further comprising an input shaft connected to the input hub.

12. The automatic transmission set forth in claim 11 further comprising a gear train coupled to the input shaft.

13. The automatic transmission set forth in claim 12 further comprising a second pump damper disposed in series with the first pump damper.

* * * * *